United States Patent
Skördeman et al.

(10) Patent No.: US 11,742,983 B2
(45) Date of Patent: Aug. 29, 2023

(54) COMMUNICATION NODE AND METHOD PERFORMED THEREIN FOR CONTROLLING TRANSMISSION

(71) Applicant: Telefonaktiebolaget LM Ericsson (publ), Stockholm (SE)

(72) Inventors: John Skördeman, Brokind (SE); Erik Eriksson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 59 days.

(21) Appl. No.: 17/601,627

(22) PCT Filed: Apr. 8, 2019

(86) PCT No.: PCT/SE2019/050322
§ 371 (c)(1),
(2) Date: Oct. 5, 2021

(87) PCT Pub. No.: WO2020/209767
PCT Pub. Date: Oct. 15, 2020

(65) Prior Publication Data
US 2022/0200725 A1    Jun. 23, 2022

(51) Int. Cl.
*H04L 1/00* (2006.01)
*H04W 36/06* (2009.01)

(52) U.S. Cl.
CPC .......... *H04L 1/0035* (2013.01); *H04L 1/0003* (2013.01); *H04L 1/0009* (2013.01); *H04L 1/0015* (2013.01); *H04W 36/06* (2013.01)

(58) Field of Classification Search
None
See application file for complete search history.

(56) References Cited

U.S. PATENT DOCUMENTS

| | | | |
|---|---|---|---|
| 2009/0005060 A1* | 1/2009 | Mazawa | H04W 28/22 455/452.2 |
| 2013/0117622 A1 | 5/2013 | Blankenship et al. | |

(Continued)

FOREIGN PATENT DOCUMENTS

| WO | 2017222534 A1 | 12/2017 |
|---|---|---|
| WO | 2018064182 A1 | 4/2018 |
| WO | 2018143740 A1 | 8/2018 |

OTHER PUBLICATIONS

International Search Report and Written Opinion dated Feb. 7, 2020 for International Application No. PCT/SE2019/050322 filed Apr. 8, 2019, consisting of 11-pages.

*Primary Examiner* — Mujtaba M Chaudry
(74) *Attorney, Agent, or Firm* — Christopher & Weisberg, P.A.

(57) ABSTRACT

Embodiments herein relate to, e.g., a method performed by a communication node for controlling one or more communication parameters of a channel between a first communication device and a second communication device in a wireless communication network. The communication node, upon obtaining an indication of a channel quality of the channel to the second communication device, uses a correction value and the indication when determining the one or more communication parameters. The correction value is based on a decoding success of one or more previous transmissions, which one or more previous transmissions are based on an obtained previous indication of a previous channel quality from the second communication device, and wherein a change of the correction value relative a previous correction value is limited.

20 Claims, 9 Drawing Sheets

(56) References Cited

U.S. PATENT DOCUMENTS

| | | | |
|---|---|---|---|
| 2014/0293921 A1 | 10/2014 | Tang | |
| 2014/0301505 A1* | 10/2014 | Miyazaki | H04L 25/067 |
| | | | 375/320 |
| 2014/0307643 A1* | 10/2014 | Froberg Olsson | H04L 5/0053 |
| | | | 370/329 |
| 2016/0050632 A1 | 2/2016 | Falahati et al. | |
| 2016/0183203 A1* | 6/2016 | Larsson | H04W 52/367 |
| | | | 370/329 |
| 2018/0103433 A1* | 4/2018 | Li | H04W 52/42 |
| 2018/0115402 A1 | 4/2018 | Takahashi et al. | |
| 2018/0131425 A1* | 5/2018 | Li | H04W 72/21 |
| 2018/0324853 A1* | 11/2018 | Jeon | H04W 52/04 |

\* cited by examiner

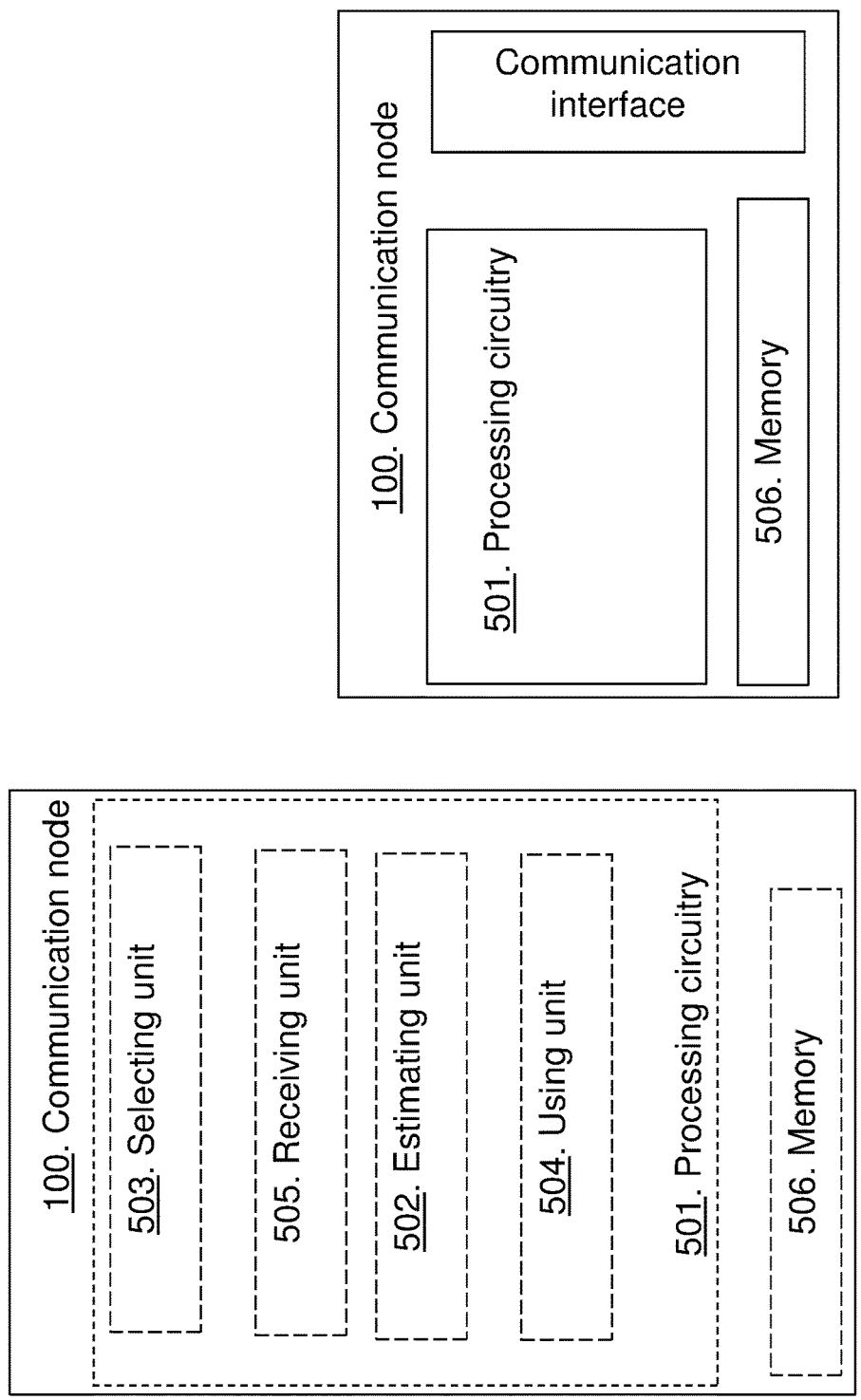
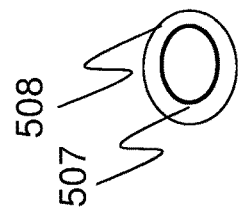
FIG. 5

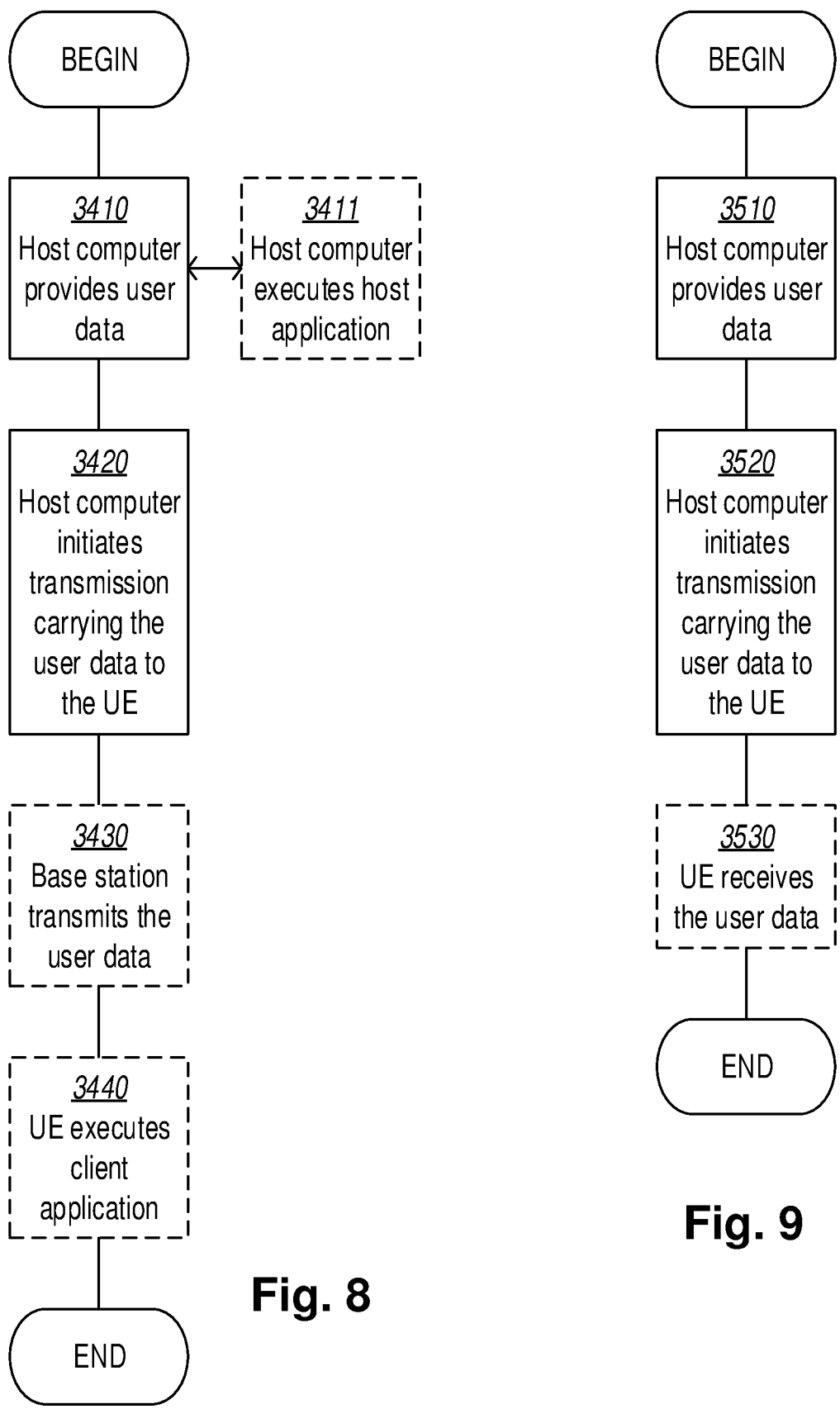

COMMUNICATION NODE AND METHOD PERFORMED THEREIN FOR CONTROLLING TRANSMISSION

CROSS-REFERENCE TO RELATED APPLICATION

This application is a Submission Under 35 U.S.C. § 371 for U.S. National Stage Patent Application of International Application Number: PCT/SE2019/050322, filed Apr. 8, 2019 entitled "COMMUNICATION NODE AND METHOD PERFORMED THEREIN FOR CONTROLLING TRANSMISSION," the entirety of which is incorporated herein by reference.

TECHNICAL FIELD

Embodiments herein relate to a communication node and method performed therein regarding wireless communication. In particular, embodiments herein relate to controlling one or more communication parameters of a channel between a first communication device and a second communication device in a wireless communication network.

BACKGROUND

In a typical wireless communication network, user equipments (UE), also known as wireless communication devices, mobile stations, wireless devices, stations (STA) and/or, may communicate via a Radio Access Network (RAN) to one or more core networks (CN). The RAN covers a geographical area which is divided into service areas, also known as cells, with each cell being served by a radio network node e.g., a Wi-Fi access point or a radio base station (RBS), which in some networks may also be called, for example, a NodeB, an eNodeB or a gNodeB. The cell is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for e.g. third generation networks, and investigate enhanced data rate and radio capacity and upcoming generation networks. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

With the emerging 5G technologies such as New Radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

In many radio access technologies (RAT), such as LTE and NR, a transmitting device such as a radio network node may need to perform link adaptation to adapt a transmission format, a code rate and/or a modulation, to an expected channel quality. To aid a link adaptation decision there is a possibility to configure a receiving device, such as a UE, to feedback radio quality measurements in a channel state information (CSI) report. There could also be feedback on how well historic link adaptation decisions have been, typically in the form of (Hybrid) Automatic Repeat reQuest (HARQ) feedback. This information can also be used to adapt the link adaptation decision. This is referred to as an outer loop while the more direct information in the CSI in referred to as inner loop. Many systems operate with both an outer loop and an inner loop. With both an outer and inner loop effects between the loops also known as inter-loop effects may degrade performance unless a time scale of one loop is significantly larger than the other. This has traditionally been the case in communication networks, but due to configuration or coverage it may not always be the case. E.g. if large number of CSI-reports are lost due to poor uplink or that the control channel load is high giving long periodicities for CSI the inner loop may be prolonged between receiving CSI reports. Also, for UEs with only light mobility the cost in overhead from CSI reporting may not make it worth having very frequently, thus, prolonging time interval of CSI reporting.

SUMMARY

An object herein is to provide a mechanism to in an efficient manner enable communication in a wireless communication network.

According to an aspect the object is achieved, according to embodiments herein, by providing a method performed by a communication node for controlling one or more communication parameters of a channel between a first communication device and a second communication device in a wireless communication network. Upon obtaining an indication of a channel quality of the channel to the second communication device the communication node uses a correction value and the indication when determining the one or more communication parameters. The correction value is based on a decoding success of one or more previous transmissions, which one or more previous transmissions are based on an obtained previous indication of a previous channel quality from the second communication device, and wherein a change of the correction value relative a previous correction value is limited.

According to another aspect the object is achieved, according to embodiments herein, by providing a communication node for controlling one or more communication parameters of a channel between a first communication device and a second communication device in a wireless communication network. The communication node is configured to, upon obtaining an indication of a channel quality of the channel to the second communication device the communication node, use a correction value and the indication when determining the one or more communication parameters. The correction value is based on a decoding success of one or more previous transmissions, which one or more previous transmissions are based on an obtained previous indication of a previous channel quality from the second communication device, and wherein a change of the correction value relative a previous correction value is limited.

It is furthermore provided herein a computer program product comprising instructions, which, when executed on at least one processor, cause the at least one processor to carry out any of the methods above, as performed by the communication node. It is additionally provided herein a computer-readable storage medium, having stored thereon a computer program product comprising instructions which, when executed on at least one processor, cause the at least one processor to carry out the method according to any of the methods above, as performed by the communication node.

Embodiments herein provide by limiting the change of the correction an improved link adaptation thereby avoiding over and/or under shoot with updates of channel quality such as CSI. Especially for cases where reporting of the channel quality is slow, i.e. long periodicity, and many feedback transmissions of decoding success or not, such as HARQ bits, have been received between each channel quality report, e.g. due to short slots or codeblock based HARQ feedback. Thus, it is herein provided an efficient manner to enable communication in the wireless communication network.

BRIEF DESCRIPTION OF THE DRAWINGS

Embodiments will now be described in more detail in relation to the enclosed drawings, in which:

FIG. 5 is a block diagram depicting a communication node according to embodiments herein;

FIG. 8 shows a host computer communicating via a base station with a user equipment over a partially wireless connection in accordance with some embodiments;

FIG. 9 shows methods implemented in a communication system including a host computer, a base station and a user equipment in accordance with some embodiments;

DETAILED DESCRIPTION

Figure 1:
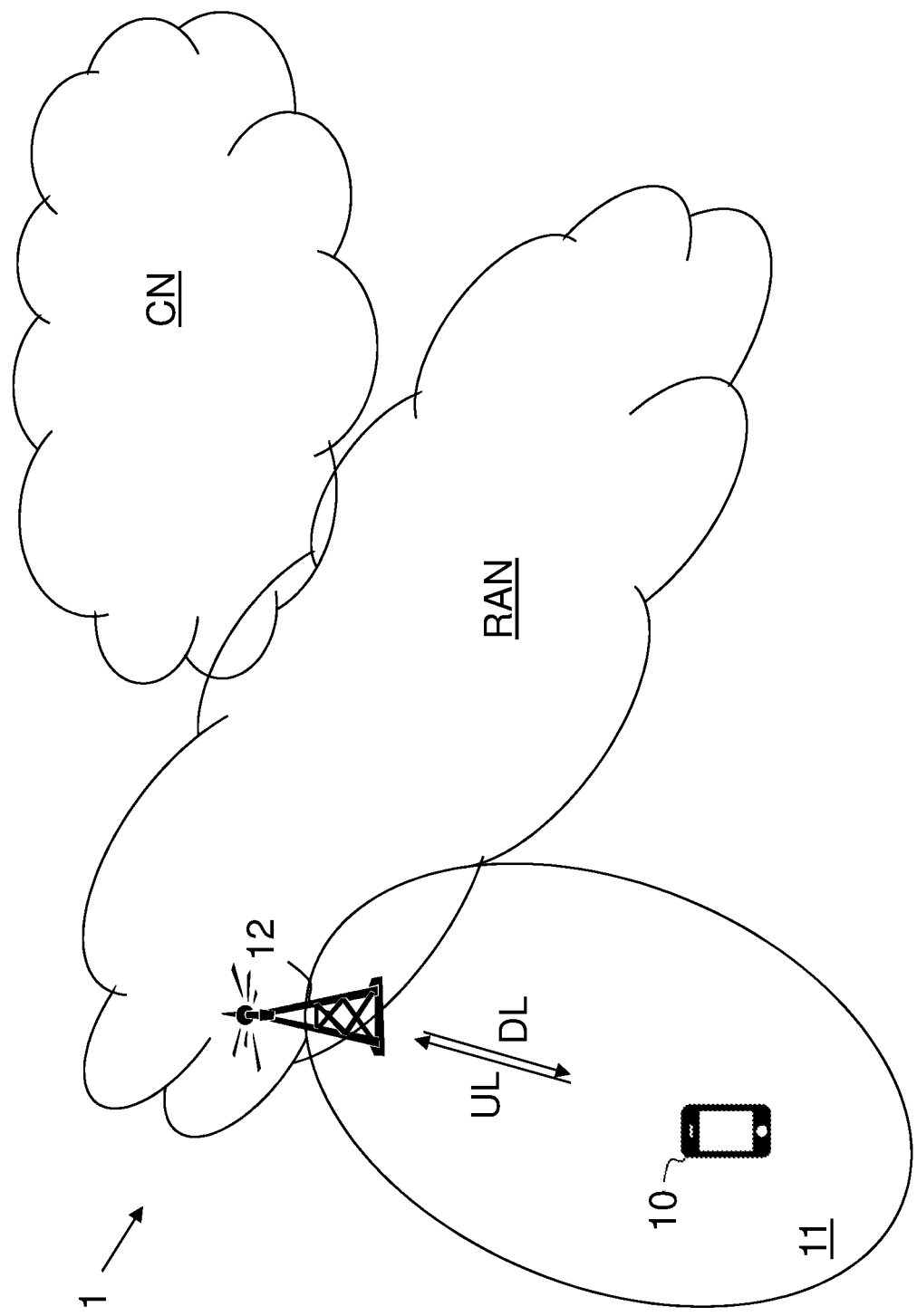
FIG. 1 is a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use one or a number of different technologies. Embodiments herein relate to recent technology trends that are of particular interest in a 5G context, however, embodiments are also applicable in further development of existing wireless communication systems such as e.g. LTE and Wideband Code Division Multiple Access (WCDMA).

In the wireless communication network 1, wireless devices configured to communicate with the RAN or with one another over a sidelink e.g. a UE 10, such as a communication device. It should be understood by the skilled in the art that "UE" is a non-limiting term which means any terminal, wireless communication terminal, wireless device, narrowband-internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node or a wireless device.

The wireless communication network 1 comprises a radio network node 12 providing radio coverage over a geographical area, a service area 11, of a first radio access technology (RAT), such as NR, LTE or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node 12 depending e.g. on the first radio access technology and terminology used. The radio network node 12 may be referred to as a serving radio network node wherein the service area may be referred to as a serving cell, and the serving network node communicates with the UEs in form of DL transmissions to the UEs and UL transmissions from the UEs. It should be noted that a service area may be denoted as cell, beam, beam group or similar to define an area of radio coverage.

Embodiments herein relate to a communication node 100 e.g. the radio network node 12, the UE 10 or another network node, for controlling communication parameters such as transmission parameters MCS e.g. perform link adaptation for a connection between a first communication device, such as the radio network node 12, and a second communication device, such as the UE 10. The second communication device may report to the first communication device CSI of the connection between them. An Inner Loop Link Adaptation (ILLA) may be used for selecting a suitable modulation and coding scheme (MCS) for the receiving device. The selection may be based on the mapping between measured Signal to Interference plus Noise Ratio (SINR) of the reference symbols to the most appropriate MCS for an allocation. An Outer Loop Link Adaptation (OLLA) may also be needed, wherein the target of the OLLA is to adapt the MCS selection to provide certain Block Error Rate (BLER). A target BLER (so called Operation Point) is usually set to provide optimal performance depending on whether retransmission mechanisms like Automatic Retransmission reQuest (ARQ) and/or Hybrid ARQ (HARQ) are utilized.

With both an outer and inner loop inter-loop effects may degrade performance unless the time scale of one loop is significantly larger than the other. This has traditionally been the case in systems, but due to configuration or coverage it may not always be the case. This could be the case if large number of CSI-reports are lost due to poor uplink or that the control channel load is high giving long periodicities for CSI. Also, for UEs with only light mobility the cost in overhead from CSI reporting may not make it worth having very frequently reported CSIs.

It is herein proposed to adapt an outer loop correction value at the reception of an inner loop measurement, the inner loop measurement either indicates a change in quality or antenna weights compared to a previous measurement. The adaptation of the outer loop correction is dependent on the outer loop correction at the time of the last measurement.

It should be noted that the first communication device may be the UE 10 and the second communication device may be the radio network node 12, or vice versa. Furthermore, the communication node 100 may be a standalone node or any of the radio network node 12 or the UE 10, that is, the communication node 100 may be any of the first communication device and the second communication device.

Embodiments herein provide an improved link adaptation by avoiding over and/or under shoot with updates of CSI. Especially for cases where CSI information is slow and many HARQ feedback bits may have been received between each report, e.g. due to short slots or codeblock based HARQ feedback.

Primary the outer loop is to complement the channel measurements and compensate for possible measurement errors. If there is a larger time gap between measurements the outer loop will also compensate for channel variations.

Embodiments herein put a limit on how much an outer loop can change between two CSI-report instances. In some embodiment the restriction is imposed at every outer loop update. In other (preferred) embodiments the restriction is only imposed at the time of receiving new CSI reports, such that the outer loop can have a larger difference, but that it is reduced once the CSI is received. In some embodiments the allowed change in outer loop correction is related to the time between the CSI reports. In some embodiments the allowed change is related to the values of the received CSI reports. The total outer loop correction could further be limited in the maximum and/or minimum absolute correction.

Figure 2:
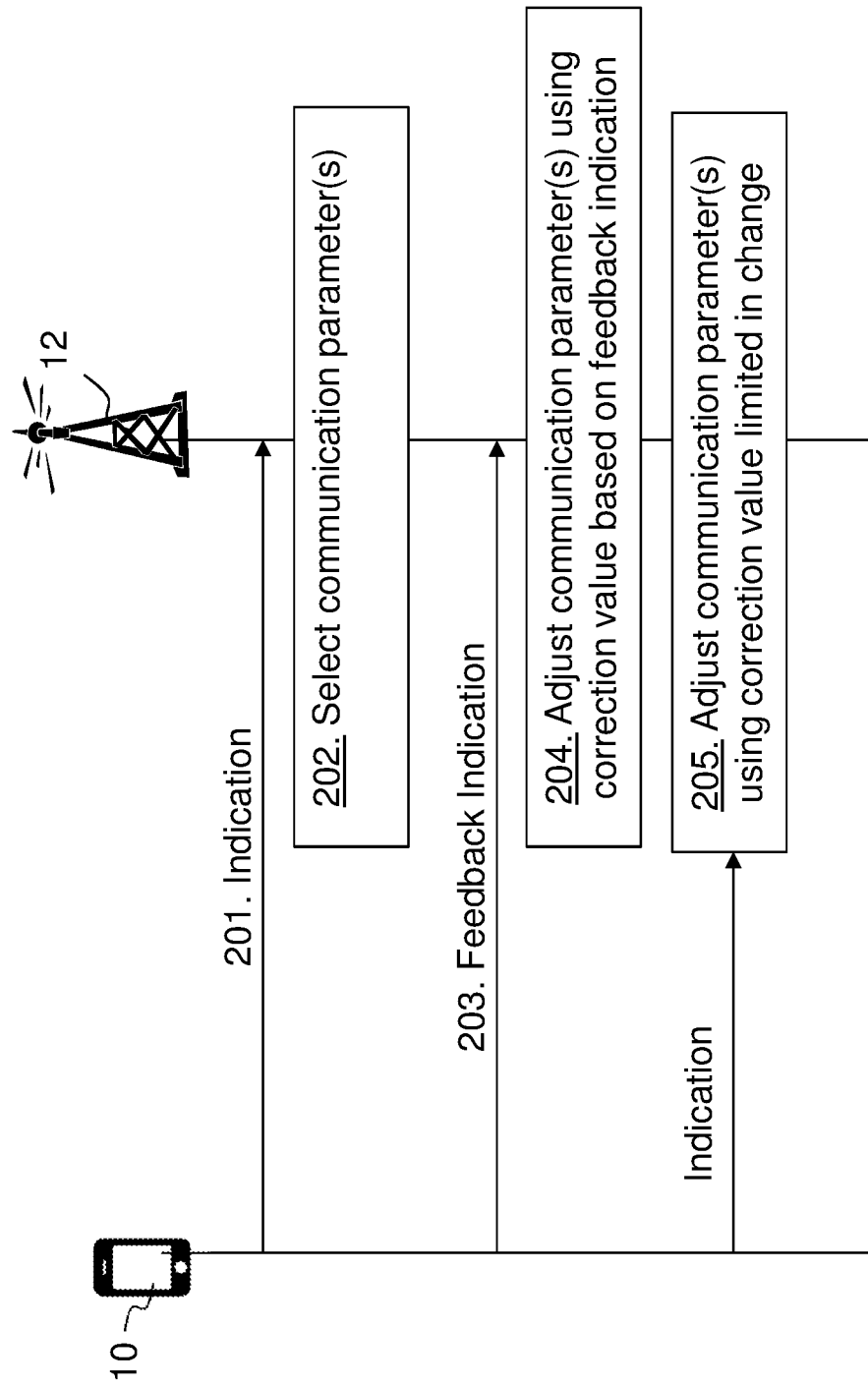
FIG. 2 shows a combined flowchart and signalling scheme according to embodiments herein.

FIG. 2 is a combined signalling scheme and flowchart according to embodiments herein. The first communication device is exemplified as the radio network node 12 and the second communication device is exemplified as the UE 10.

Action 201. The UE 10 may transmit to the radio network node 12 an indication such as a CSI report indicating channel quality. The radio network node 12 may thus perform a channel estimation of the channel to the UE 10 based on the indication (also known as a previous indication) from the UE 10.

Action 202. The radio network node 12 selects the one or more transmission parameters for the channel based on the channel estimation. This may be called inner loop.

Action 203. The radio network node 12 receives one or more feedback indications such as HARQ bits.

Action 204. The radio network node 12 may further adjust the one or more transmission parameters for the channel based on the one or more feedback indications by using a correction value for the channel estimation. The correction value is based on reception of indication of successful and/or non-successful decoding. This may be called outer loop.

Action 205. According to embodiments herein, the radio network node may upon reception of an update of the channel quality report from the UE 10, use a correction value and the indication when determining the one or more communication parameters. The correction value is based on a decoding success of one or more previous transmissions i.e. outer loop, which one or more previous transmissions are based on the previous indication of the previous channel estimate, and wherein a change of the correction value relative a previous correction value is limited also referred to as delta OLA. The correction value may be a value of a time series value that is updated upon reception of e.g. and ACK or NACK, upon updating the channel estimate the change is limited i.e. limited relative a previous value.

Figure 3:
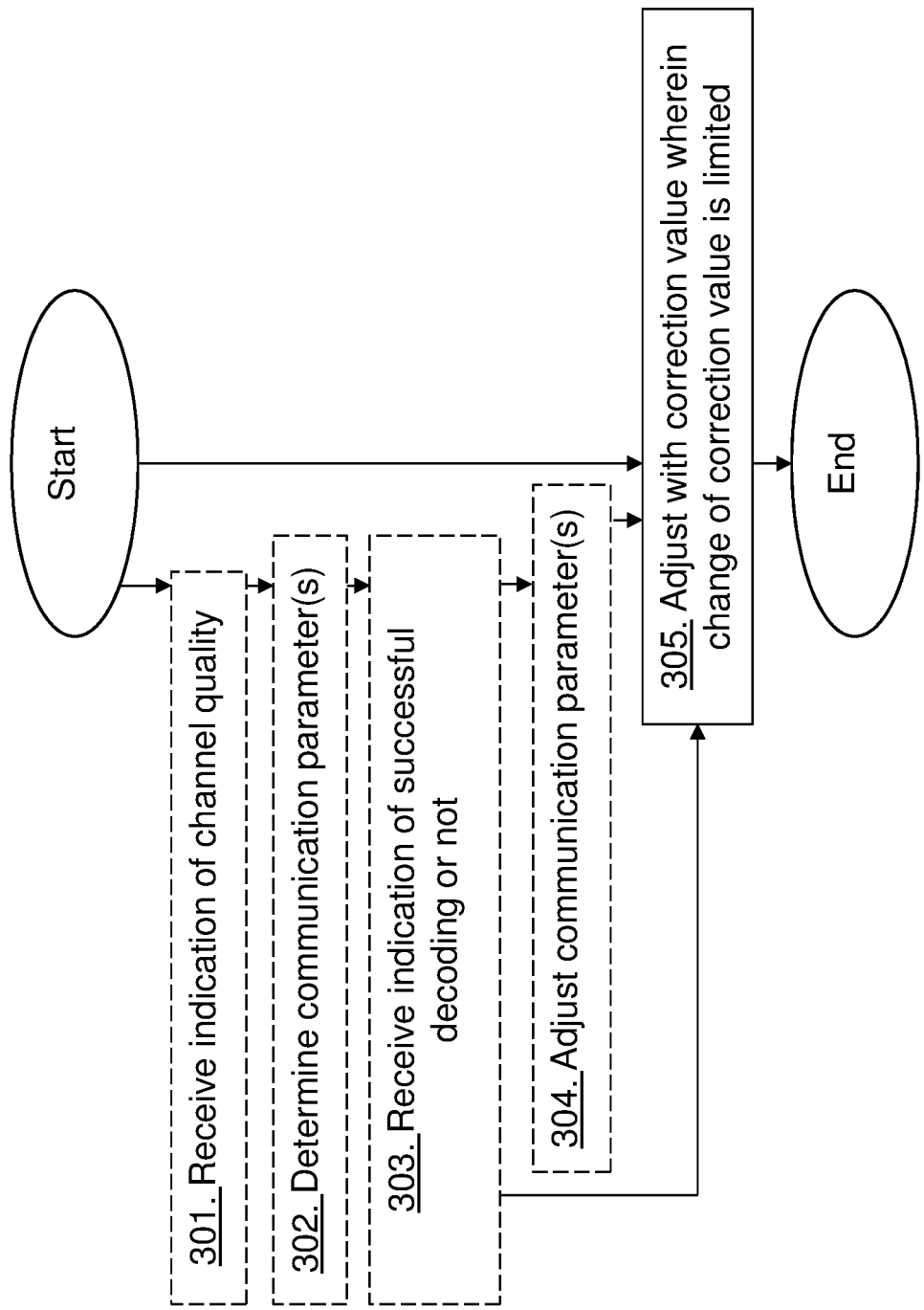
FIG. 3 is a flowchart depicting a method performed by a communication node according to embodiments herein.

The method actions performed by the communication node 100 for controlling one or more communication parameters of a channel between the first communication device and the second communication device in the wireless communication network 1 according to embodiments will now be described with reference to a flowchart depicted in FIG. 3. The actions do not have to be taken in the order stated below, but may be taken in any suitable order. Actions performed in some embodiments are marked with dashed boxes.

Action 301. The communication node 100 may perform a channel estimation of the channel to the second communication device based on the previous indication from the second communication device.

Action 302. The communication node 100 may then select the one or more transmission parameters for the channel based on the channel estimation.

Action 303. The communication node 100 may then receive one or more feedback indications, indicating decoding success of one or more transmissions called previous transmissions.

Action 304. The communication node 100 may further adjust the one or more transmission parameter based on the one or more feedback indications by using the correction value for the channel estimation, wherein the correction value is based on the received one or more feedback indication such as HARQ bits.

Action 305. Upon obtaining an indication of a channel quality of the channel to the second communication device, the communication node 100 uses a correction value and the indication when determining the one or more communication parameters. The correction value is based on a decoding success of one or more previous transmissions i.e. outer loop, which one or more previous transmissions are based on an obtained previous indication of a previous channel quality from the second communication device, and wherein a change of the correction value relative a previous correction value is limited. The change may be limited based on a difference of the channel quality and the previous channel quality. The change may be limited based on a difference in time when the indication was received and when the previous indication was received. By taking the time into account one may limit more or less depending whether it was long time between innerloop updates. The change may be limited based on whether the correction value is a positive value or a negative value. In some embodiments there is no restriction on how much the outer loop can correct up, e.g. channel quality experienced as better than quality reporting indicates, but a restriction is put on how much it can correct down.

The change may be limited based on whether the channel quality and the previous channel quality is related to a same channel or to different channels. In some embodiments may different values be used dependent on if the report is within the same or between different beams. In some embodiments the outer loop update allowed depend on the distance between two reported beams, in angular domain between the main direction of the beams or in some other spatial or angular domain reflecting the expected difference in quality between two beams in the vicinity of the user. Beams may in this aspect be defined as spatial directions and spread defined by how the signal maps to all or a subset of the transmitting antennas. The indication and the precious indication may be related to a measurement at the second communication device or the first communication device. Thus the indication and the precious indication may be one or more CSI reports or similar.

The communication node may be the first communication device. E.g. the radio network node 12 may perform the method herein. The one or more communication parameters may be one or more transmission parameters e.g. MCS and/or BLER.

As an example:

```
Initialization:
OLA_last_meas = outer loop adjustment (OLA);
CQ_last_meas = channel quality (CQ);
// At CSI update of a same beam:
    Delta_ola = OLA - OLA_last_meas;
    Delta_CQ = CQ - CQ_last_meas;
    % Same beam: Channel improved since last measurement
    if OLA > OLA_last_meas
        OLA = OLA_last_meas + min(max(Delta_ola -
        max(Delta_CQ, 0), 0), delta_max);
    else %(Channel worse since last measurement)
        OLA = OLA_last_meas + max(min(Delta_ola -
        min(Delta_CQ, 0),0), -delta_max);
    end
// Different beam:
    OLA = OLA_old + max(min(Delta_ola, delta_max), -
    delta_max)
```

In the description OLA is the current outer loop correction value and CQ is the current quality estimate without outer loop. Delta_max is the maximum correction, for simplicity the same value is used in the description, but embodiments are not limited to this case. In some embodiments different maximum correction value could be used dependent on if it is a correction upwards or downwards, i.e. positive or negative.

Figure 4:
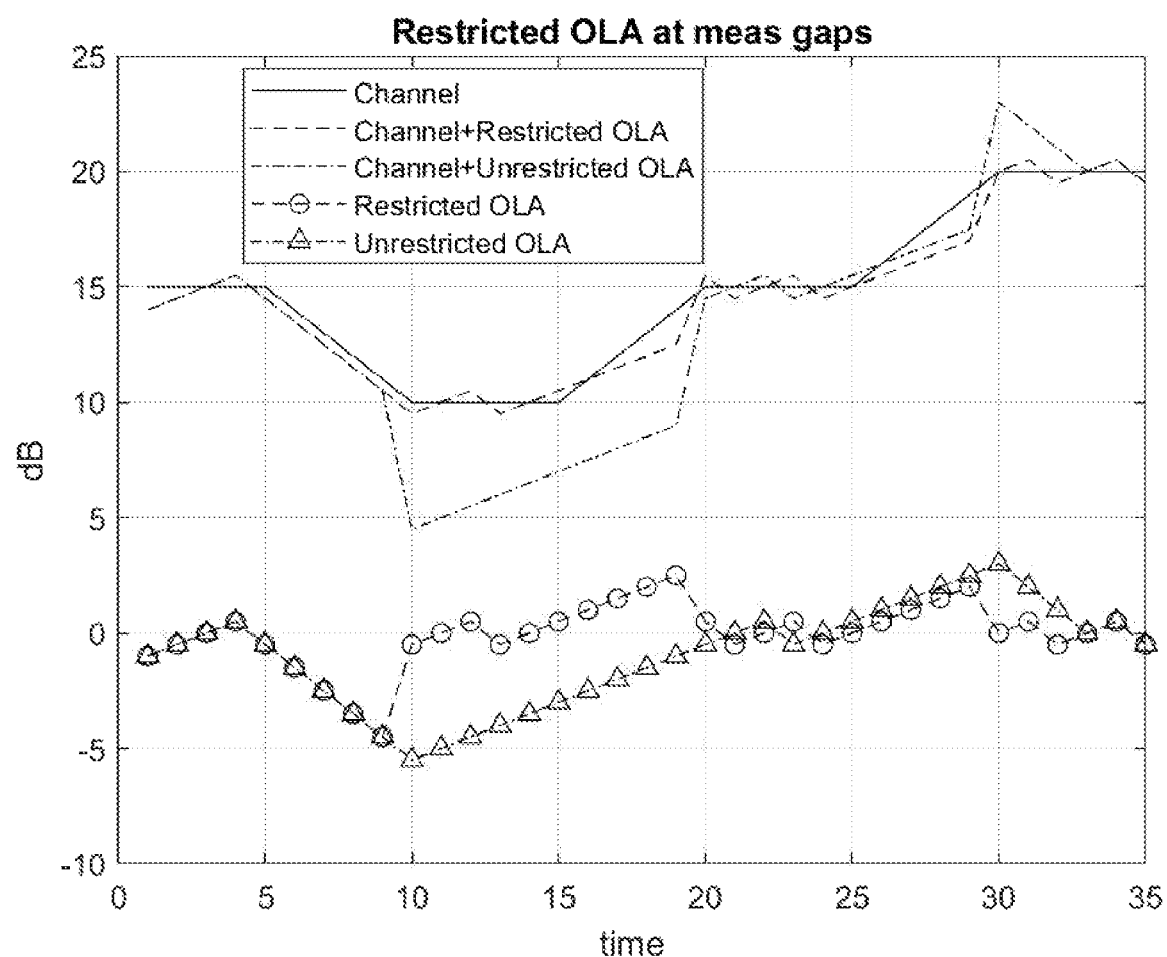
FIG. 4 is a block diagram depicting outer loop adjustment (OLA) and channel estimates.

FIG. 4 shows results of channel estimate in the top of the figure and OLA in the low part of the figure denoted as restricted and unrestricted OLA. Restricted means using the method disclosed herein and unrestricted means not using the method herein. Examples with fading channel are shown, where a new report is received at every 5 time instance for the same beam. Restricted OLA gives a good channel estimate while unrestricted (baseline) underestimates the channel at end of degradation and over estimating at end of channel enhancement. By restricting the change of the correction value upon reception of channel indications such as CSI report the result is that a more accurate communication parameter such as MCS may be used resulting in a more resource efficient solution. In the figure OLA is updated every tti but measurements of channel quality are received every $5^{th}$ transmission time interval (TTI).

At channel degradation OLA is decreased due to many NACKs to compensate for the too optimistic old measurement. Next channel measurement is reflecting the degraded channel. If the unrestricted OLA is added to the new measurement it result in a channel estimation that has compensated for the degraded channel 2 times, leading to a pessimistic link adaptation and lower throughput. Given the relatively slow adaption on ACK it will take some time until the estimate correlates with the channel. The area framed by "Channel" and Channel+Unrestricted OLA" is a measure of non-optimal LA. Reversed behavior is found when channel is improved. Hence, using the "Restricted OLA" better reflects the channel.

FIG. 5 is a block diagram depicting the communication node 100 for handling communication according to embodiments herein.

The communication node 100 may comprise processing circuitry 501, e.g. one or more processors, configured to perform the methods herein.

The communication node 100 may comprise an estimating unit 502. The communication node 100, the processing circuitry 501, and/or the estimating unit 502 may be configured to perform the channel estimation of the channel to the second communication device based on the previous indication from the second communication device.

The communication node 100 may comprise a selecting unit 503. The communication node 100, the processing circuitry 501, and/or the selecting unit 503 may be configured to select the one or more transmission parameters for the channel based on the channel estimation.

The communication node 100 may comprise a using unit 504. The communication node 100, the processing circuitry 501, and/or the using unit 504 is configured to, upon obtaining an indication of a channel quality of the channel to the second communication device the communication node, use a correction value and the indication when determining one or more communication parameters. The correction value is based on a decoding success of one or more previous transmissions, which one or more previous transmissions are based on an obtained previous indication of a previous channel quality from the second communication device, and wherein a change of the correction value relative a previous correction value is limited.

The communication node 100 may comprise a receiving unit 505. The communication node 100, the processing circuitry 501, and/or the receiving unit 505 may be configured to receive one or more feedback indications, indicating decoding success of one or more transmissions called previous transmissions.

The communication node 100 further comprises a memory 506. The memory comprises one or more units to be used to store data on, such as correction value, CSI, channel estimates, OLA, applications to perform the methods disclosed herein when being executed, and similar. The communication node 100 may comprise a communication interface e.g. one or more antennas.

The methods according to the embodiments described herein for the communication node 100 are respectively implemented by means of e.g. a computer program product 3507 or a computer program, comprising instructions, i.e., software code portions, which, when executed on at least one processor, cause the at least one processor to carry out the actions described herein, as performed by the communication node 100. The computer program product 3507 may be stored on a computer-readable storage medium 508, e.g. a disc, a universal serial bus (USB) stick or similar. The computer-readable storage medium 508, having stored thereon the computer program, may comprise the instructions which, when executed on at least one processor, cause the at least one processor to carry out the actions described herein, as performed by the communication node 100. In some embodiments, the computer-readable storage medium may be a transitory or a non-transitory computer-readable storage medium.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 6:
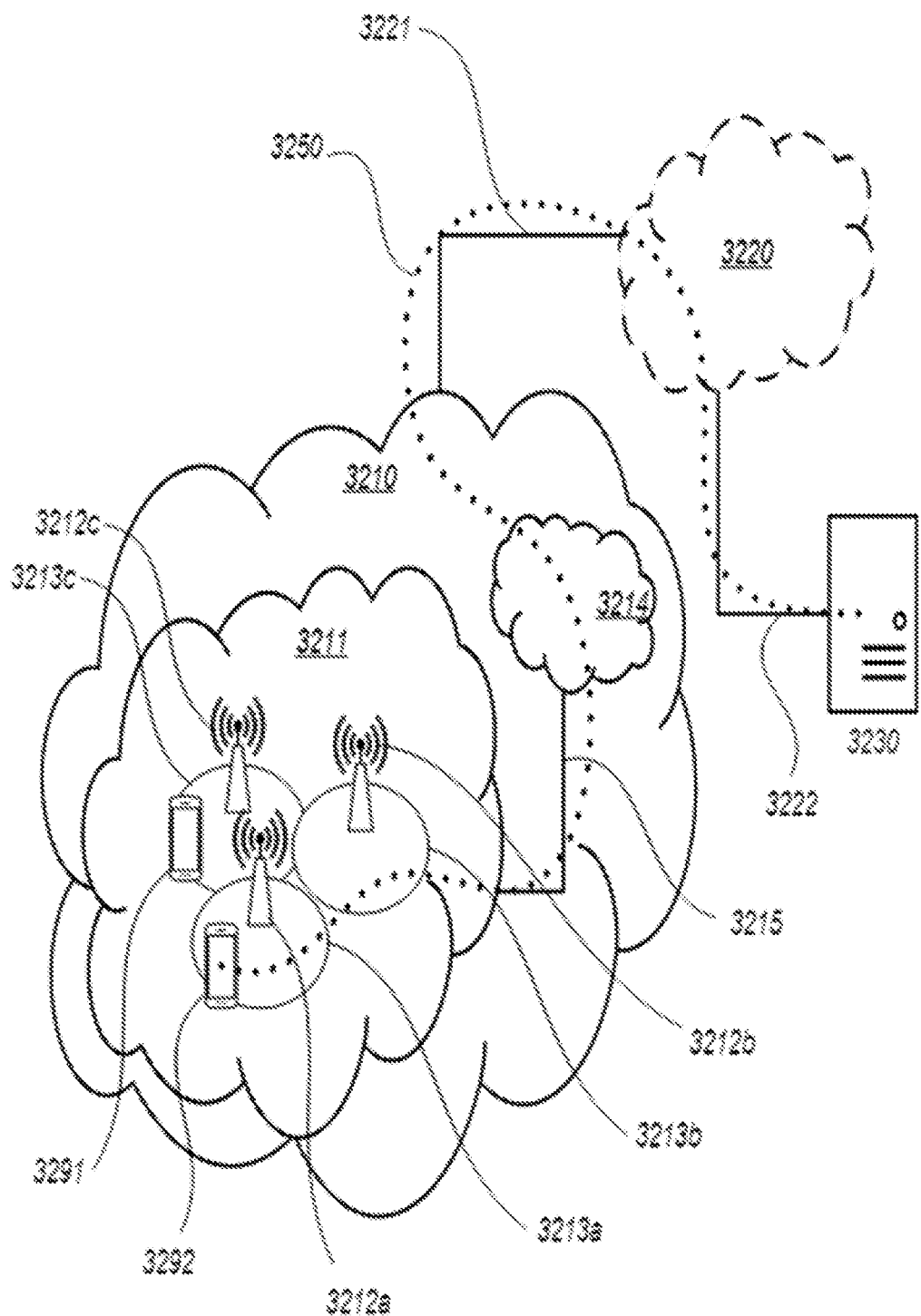
FIG. 6 shows a telecommunication network connected via an intermediate network to a host computer in accordance with some embodiments

FIG. 6: Telecommunication network connected via an intermediate network to a host computer in accordance with some embodiments With reference to FIG. 6, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points being examples of the radio network node 12 above, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example being examples of the UE 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 6 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 7:
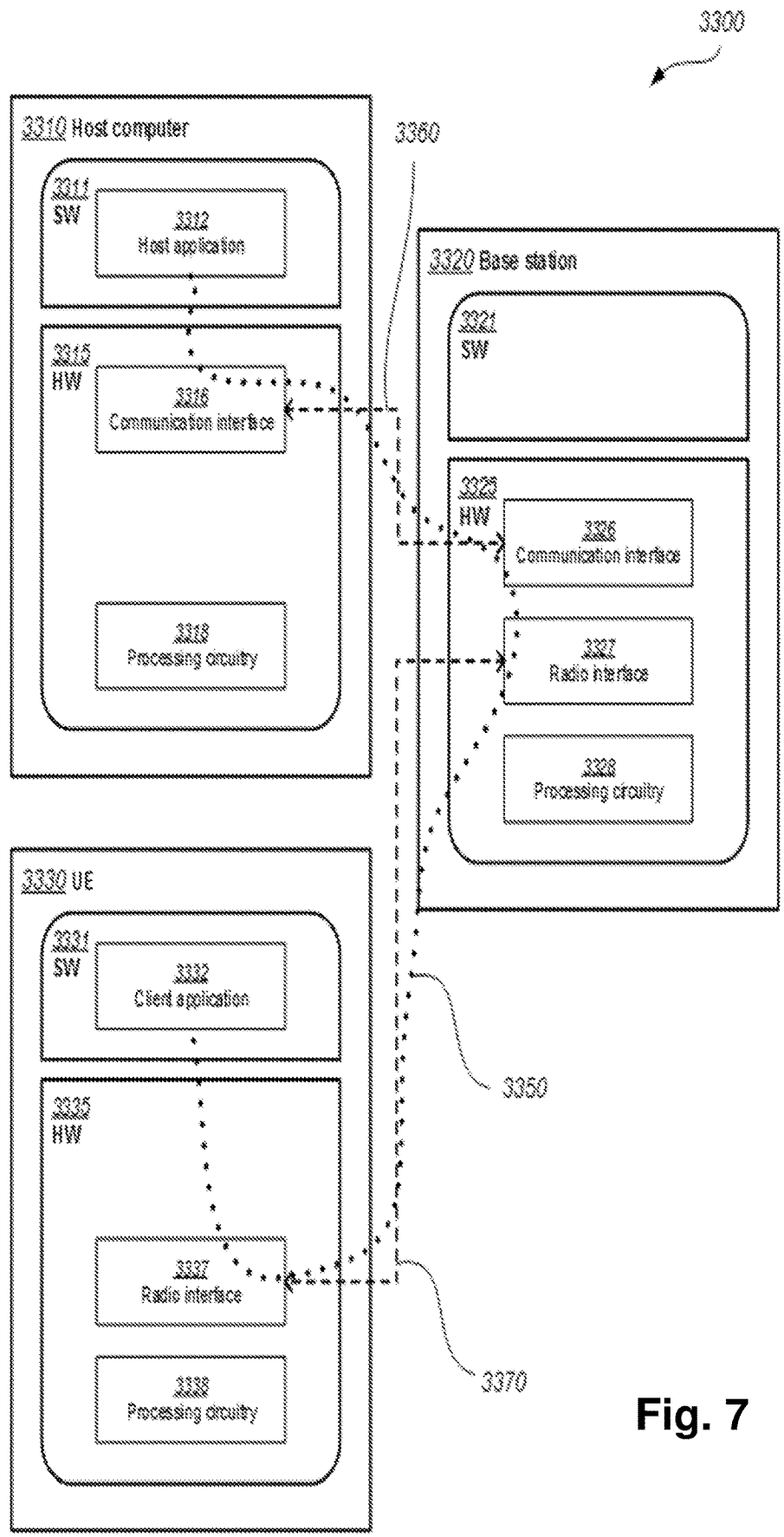
FIG. 7 shows a telecommunication network connected via an intermediate network to a host computer in accordance with some embodiments.

FIG. 7: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 7. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 7) served by base station 3320. Communication interface 3326 may be configured to facilitate connection 3360 to host computer 3310. Connection 3360 may be direct or it may pass through a core network (not shown in FIG. 7) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3336, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3336. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 7 may be similar or identical to host computer 3230, one of base stations 3212a, 3212b, 3212c and one of UEs 3291, 3292 of FIG. 6, respectively. This is to say, the inner workings of these entities may be as shown in FIG. 7 and independently, the surrounding network topology may be that of FIG. 6.

In FIG. 7, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency since the resources that may be used in a more efficient manner since the channel estimates are closer to actual value and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

FIG. 8: Methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 9: Methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 10:
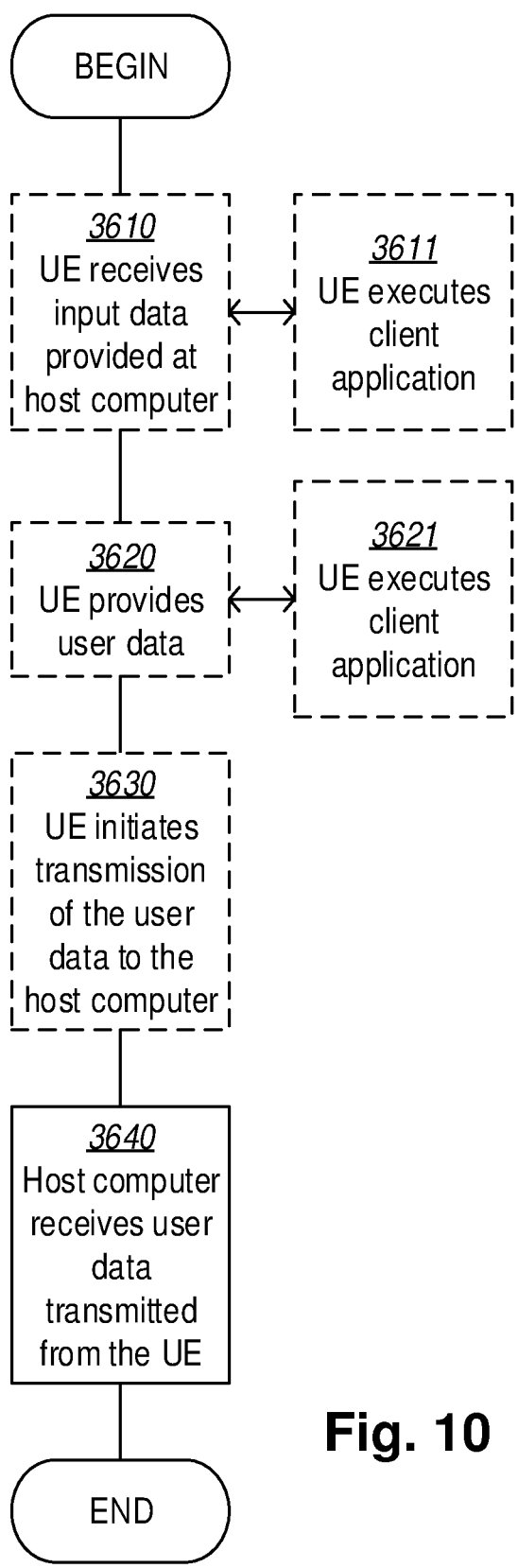
FIG. 10 shows methods implemented in a communication system including a host computer, a base station and a user equipment in accordance with some embodiments.

FIG. 10: Methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 11:
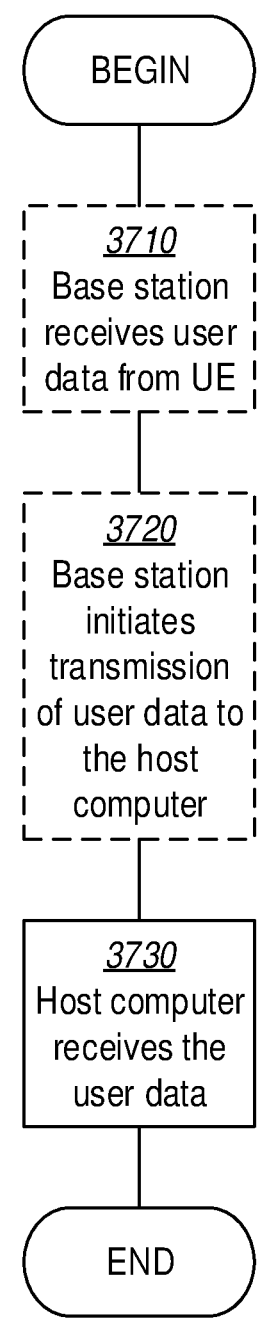
FIG. 11 shows methods implemented in a communication system including a host computer, a base station and a user equipment in accordance with some embodiments.

FIG. 11: Methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

| Abbreviation | Explanation |
| --- | --- |
| 3G | Third Generation of Mobile Telecommunications Technology |
| BSM | Basic Safety Message |
| BW | Bandwidth |
| BSR | Buffer Status Report |
| CAM | Cooperative Awareness Message |
| CBR | Channel Busy Ratio |
| DPTF | Data Packet Transmission Format |
| D2D | Device-to-Device Communication |
| DENM | Decentralized Environmental Notification Message |

-continued

| Abbreviation | Explanation |
|---|---|
| DSRC | Dedicated Short-Range Communications |
| eNB | eNodeB |
| ETSI | European Telecommunications Standards Institute |
| LTE | Long-Term Evolution |
| NW | Network |
| RS | Reference Signals |
| TF | Transport Format |
| SAE | Society of the Automotive Engineers |
| UE | User Equipment |
| V2I | Vehicle-to-Infrastructure |
| V2P | Vehicle-to-Pedestrian |
| V2V | Vehicle-to-(vehicle) communication |
| V2x | Vehicle-to-anything-you-can-imagine |
| wrt | with respect to |
| SPS | Semi Persistent Scheduling |
| DMRS | Demodulation reference signals |
| OCC | Orthogonal cover code |
| PDCCH | Physical Downlink Control Channel |
| DBS | Delay-Based Scheduler |
| MAC | Medium Access Control |
| MAC CE | MAC Control Element |
| PUSCH | Physical Uplink Shared Channel |
| PUCCH | Physical Uplink Control Channel |
| PDU | Packet Data Unit |
| 3GPP | Third Generation Partnership Project |
| LCID | Logical Channel Identity |
| MAC | Medium Access Control |
| MAC CE | Medium Access Control - Control Element |
| RRC | Radio Resource Control |
| IP | Internet Protocol |
| PPPP | ProSe Per Packet Priority |
| ProSe | Proximity Services |
| PRB | Physical Resource Block |
| SL | Sidelink |
| SPS | Semi-Persistent Scheduling |
| UL | Uplink |
| DL | Downlink |
| LCG | Logical Channel Group |
| SFN | System Frame Number |
| TTI | Transmission Time Interval |
| SCI | Sidenlink Control Information |
| CA | Carrier Aggregation |
| SLRB | Sidelink Radio Bearer |
| UICC | Universal Integrated Circuit Card |
| ME | Mobile Equipment |
| ID | Identifier |
| PDB | Packet Delay Budget |
| CBR | Congestion Busy Ratio |
| SDU | Service Data Unit |
| PDU | Protocol Data Unit |
| BLER | Block Error Rate |
| CRG | Communication Requirement Group |
| AS | Access stratum |

The invention claimed is:

1. A method performed by a communication node for controlling one or more communication parameters of a channel between a first communication device and a second communication device in a wireless communication network, the method comprising:
upon obtaining an indication of a channel quality of the channel to the second communication device using a correction value and the indication when determining the one or more communication parameters, the correction value being based on a decoding success of one or more previous transmissions, which one or more previous transmissions are based on an obtained previous indication of a previous channel quality from the second communication device, and a change of the correction value relative to a previous correction value being limited.

2. The method according to claim 1, wherein the change is limited based on a difference of the channel quality and the previous channel quality.

3. The method according to claim 2, wherein the change is limited based on a difference in time when the indication was received and when the previous indication was received.

4. The method according to claim 2, wherein the change is limited based on whether the correction value is one of a positive value and a negative value.

5. The method according to claim 2, wherein the change is limited based on whether the channel quality and the previous channel quality is related to one of a same channel and different channels.

6. The method according to claim 1, wherein the change is limited based on a difference in time when the indication was received and when the previous indication was received.

7. The method according to claim 1, wherein the change is limited based on whether the correction value is one of a positive value and a negative value.

8. The method according to claim 1, wherein the change is limited based on whether the channel quality and the previous channel quality is related to one of a same channel and different channels.

9. The method according to claim 1, wherein the indication and the precious indication is related to a measurement at one of the second communication device and the first communication device.

10. The method according to claim 1, wherein the communication node is the first communication device.

11. The method according to claim 1, wherein the one or more communication parameters are one or more transmission parameters.

12. A communication node for controlling one or more communication parameters of a channel between a first communication device and a second communication device in a wireless communication network, the communication node being configured to:
upon obtaining an indication of a channel quality of the channel to the second communication device, use a correction value and the indication when determining the one or more communication parameters, the correction value being based on a decoding success of one or more previous transmissions, which one or more previous transmissions are based on an obtained previous indication of a previous channel quality from the second communication device, and a change of the correction value relative to a previous correction value being limited.

13. The communication node according to claim 12, wherein the change is limited based on a difference of the channel quality and the previous channel quality.

14. The communication node according to claim 12, wherein the change is limited based on a difference in time when the indication was received and when the previous indication was received.

15. The communication node according to claim 12, wherein the change is limited based on whether the correction value is one of a positive value and a negative value.

16. The communication node according to claim 12, wherein the change is limited based on whether the channel quality and the previous channel quality is related to one of a same channel and different channels.

17. The communication node according to claim 12, wherein the indication and the precious indication is related to a measurement at one of the second communication device and the first communication device.

18. The communication node according to claim 12, wherein the communication node is the first communication device.

19. The communication node according to claim 12, wherein the one or more communication parameters are one or more transmission parameters.

20. A non-transitory computer-readable storage medium having stored thereon a computer program comprising instructions which, when executed on at least one processor, cause the at least one processor perform a method for controlling one or more communication parameters of a channel between a first communication device and a second communication device in a wireless communication network, the method comprising:

upon obtaining an indication of a channel quality of the channel to the second communication device, using a correction value and the indication when determining the one or more communication parameters, the correction value being based on a decoding success of one or more previous transmissions, which one or more previous transmissions are based on an obtained previous indication of a previous channel quality from the second communication device, and a change of the correction value relative to a previous correction value being limited.

* * * * *